(12) United States Patent
Suzuki

(10) Patent No.: US 12,503,226 B2
(45) Date of Patent: Dec. 23, 2025

(54) AIRCRAFT

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 131 days.

(21) Appl. No.: 17/795,215

(22) PCT Filed: Sep. 29, 2020

(86) PCT No.: PCT/JP2020/036892
§ 371 (c)(1),
(2) Date: Jul. 25, 2022

(87) PCT Pub. No.: WO2022/070254
PCT Pub. Date: Apr. 7, 2022

(65) Prior Publication Data
US 2023/0056709 A1    Feb. 23, 2023

(51) Int. Cl.
*B64C 29/00* (2006.01)
*B64D 9/00* (2006.01)
(Continued)

(52) U.S. Cl.
CPC ............. *B64C 29/0008* (2013.01); *B64D 9/00* (2013.01); *B64U 50/19* (2023.01); *B64U 10/13* (2023.01); *B64U 30/20* (2023.01)

(58) Field of Classification Search
CPC .......... B64C 1/0009; B64C 2001/0045; B64C 29/0008; B64C 3/10; B64U 10/13; B64U 20/70; B64U 10/14; B64U 2101/64
See application file for complete search history.

(56) References Cited

U.S. PATENT DOCUMENTS

| | | | | |
|---|---|---|---|---|
| 2,868,476 A | * | 1/1959 | Schlieben | ........... B64C 29/0033 244/7 C |
| 2,951,661 A | * | 9/1960 | Dorman | ................. B64C 27/20 244/34 A |

(Continued)

FOREIGN PATENT DOCUMENTS

| | | | | |
|---|---|---|---|---|
| CN | 103803056 A | | 5/2014 | |
| CN | 109279007 A | * | 1/2019 | ............. B64C 27/22 |

(Continued)

OTHER PUBLICATIONS

Grabis, Michael and Agarwal, Ramesh. Computation Fluid Dynamics Analysis of High Lift, Inverted Airfoils in Ground Effect, Apr. 30, 2018.*

(Continued)

*Primary Examiner* — Philip J Bonzell
(74) *Attorney, Agent, or Firm* — HAUPTMAN HAM, LLP

(57) ABSTRACT

An aircraft that can improve cruising speed by making the body shape of the airframe (especially, multicopter) into a shape that has less unnecessary positive lift force by the main body and less drag in the cruising posture of the airframe. An aircraft equipped with a plurality of rotary blades including a propeller and a motor, wherein the aircraft comprises a main body with an inverted airfoil shape. The main body has an attack angle that does not generate a lift force or produces a negative lift force during cruising. The main body has a positive attack angle of 12 degrees or less. Further, it is provided with a mounting unit on which a mounted object can be mounted. The mounting unit is connected to the main body via the connection unit.

9 Claims, 18 Drawing Sheets

(51) Int. Cl.
*B64U 50/19* (2023.01)
*B64U 10/13* (2023.01)
*B64U 30/20* (2023.01)

(56) References Cited

U.S. PATENT DOCUMENTS

| | | | | |
|---|---|---|---|---|
| 3,350,035 | A * | 10/1967 | Schlieben | B64C 29/02 244/7 R |
| 8,282,036 | B2 * | 10/2012 | Funck | B64C 3/56 244/119 |
| 8,505,846 | B1 * | 8/2013 | Sanders, II | B64C 11/003 244/7 B |
| 9,254,916 | B2 * | 2/2016 | Yang | B64C 3/546 |
| 9,630,713 | B1 * | 4/2017 | Von Novak, III | B64U 20/70 |
| 9,714,090 | B2 | 7/2017 | Frolov | |
| 10,183,746 | B2 * | 1/2019 | McCullough | B64D 25/12 |
| 10,214,285 | B2 * | 2/2019 | McCullough | G05D 1/0011 |
| 10,220,944 | B2 * | 3/2019 | McCullough | B64C 29/02 |
| 10,227,133 | B2 * | 3/2019 | McCullough | B64D 17/80 |
| 10,232,950 | B2 * | 3/2019 | McCullough | B64U 60/40 |
| 10,329,014 | B2 * | 6/2019 | McCullough | B64C 11/46 |
| 10,343,773 | B1 * | 7/2019 | McCullough | B64D 25/12 |
| 10,442,522 | B2 * | 10/2019 | Oldroyd | B64C 27/52 |
| 10,501,193 | B2 * | 12/2019 | Oldroyd | B64D 27/40 |
| 11,148,806 | B2 * | 10/2021 | Suzuki | B64U 10/13 |
| 11,459,099 | B2 * | 10/2022 | McCullough | B64C 39/08 |
| 11,820,506 | B2 * | 11/2023 | Suzuki | B64U 50/19 |
| 2003/0094537 | A1 | 5/2003 | Austen-Brown | |
| 2010/0051740 | A1 * | 3/2010 | Yoeli | B64U 30/20 244/17.23 |
| 2011/0168832 | A1 * | 7/2011 | Funck | B64C 3/56 244/12.1 |
| 2017/0292499 | A1 | 10/2017 | Sia | |
| 2018/0002009 | A1 * | 1/2018 | McCullough | B64C 29/0033 |
| 2018/0002026 | A1 * | 1/2018 | Oldroyd | B64C 29/0033 |
| 2018/0141647 | A1 * | 5/2018 | Suzuki | B64U 50/13 |
| 2018/0305018 | A1 * | 10/2018 | Tian | B64U 10/13 |
| 2019/0106207 | A1 | 4/2019 | Park | |
| 2020/0001995 | A1 | 1/2020 | Yang | |
| 2020/0094959 | A1 * | 3/2020 | Suzuki | B64U 50/19 |
| 2020/0377207 | A1 * | 12/2020 | Suzuki | B64D 9/00 |

FOREIGN PATENT DOCUMENTS

| | | | | |
|---|---|---|---|---|
| CN | 209176908 U | * | 7/2019 | B64C 27/22 |
| CN | 110691733 A | | 1/2020 | |
| CN | 110789710 | | 2/2020 | |
| JP | H11-513635 A | | 11/1999 | |
| JP | 2006-051841 A | | 2/2006 | |
| JP | 2009-538773 A | | 11/2009 | |
| JP | 2015117003 A | | 6/2015 | |
| JP | 20170171291 A | | 9/2017 | |
| JP | 2018-068471 A | | 5/2018 | |
| JP | 2020524106 A | | 8/2020 | |
| JP | 2021-160437 A | | 10/2021 | |
| JP | 6952389 B1 | | 10/2021 | |
| WO | WO-2007052271 A2 | * | 5/2007 | B60V 3/08 |
| WO | 2018/225112 A1 | | 12/2018 | |

OTHER PUBLICATIONS

Notice of reasons for refusal dated Feb. 1, 2024 for JP Patent application 2021-151757.
Notice of reasons for refusal dated Jul. 1, 2021 for related Japanese Patent Application No. 2020-559009.
Supplementary European Search Report dated May 29, 2024 European Patent Application No. 20956184.4.
Office Action in CN application No. 202111150361.0, dated Dec. 31, 2024, 14pp.
Office Action in JP application No. 2024-095384, dated Aug. 28, 2025, 6pp.
Office Action in JP application No. 2024-095384, mailed Jul. 10, 2025, 6pp.

* cited by examiner

Generation direction of lift force

AIRCRAFT

TECHNICAL FIELD

The present invention relates to an aircraft.

BACKGROUND ART

In recent years, research and demonstration experiments have been conducted for the practical application of services using an aircraft such as a drone or an unmanned aerial vehicle (UAV) (hereinafter collectively referred to as "aircraft"). An aircraft (hereinafter collectively referred to as a multicopter) that includes a plurality of fixed-pitch propellers and moves by tilting the airframe, which is generally called a multicopter, has a simple structure as compared to VTOL aircraft equipped with a tilt rotor and tilt wing mechanism on the main wing, and thus, has the advantages of making production and maintenance easy, and having few failure points.

However, the multicopter-shaped airframe is inferior in fuel consumption to a VTOL aircraft that flies using the lift generated by the main wing, and the drag generated by the main body is not taken into consideration. In view of such a situation, Patent Literature 1 discloses an aircraft that reduces the load on the rotary blade. (see, for example, Patent Literature 1).

PRIOR ART LIST

Patent Literature

[Patent Literature 1] U.S. Patent Application Publication No. 2020/0001995

SUMMARY OF THE INVENTION

Technical Problem

In Patent Literature 1, by setting an angle between the rotation axis of the rotary blade and a normal line of the reference plane of the main body to be between 5 and 30 degrees, an aircraft (hereinafter collectively referred to as conventional aircraft) has been developed for the purpose of forming a positive attack angle when the rotorcraft moves forward, and reducing the load on the rotorcraft and improving the flight time by a lift force generated by the main body.

The multicopter constantly consumes energy while it stays in the air. Conventional aircraft reduces energy consumption and improves flight time. However, as shown in FIGS. 16 to 17, like the conventional aircraft, in a shape in which the main body 10 generates a positive lift force during cruising and reduces the load on the rotary blade, when the number of rotations of the rotary blade is increased to increase the cruising speed, both the upward lift force generated by the rotary blade and the force that the aircraft rises by a lift force generated by the main body 10 increase. Therefore, the forwarding speed decreases, for example, the flight vehicle cannot move forward in the horizontal direction and heads diagonally upward.

Further, if the number of revolutions of the rotary blades is suppressed so that the flight vehicle does not move upward, the propulsion force decreases according to the amount of decrease in the number of revolutions, and thus, the cruising speed of the flight vehicle decreases.

In transportation, inspection, photography and the like, which are mentioned as services to be put into practical use, movement speed is required, especially is remarkable in the transportation field. Improving the movement speed means that the energy consumption of the entire flight system leads to the improvement of the fuel efficiency of the entire system. For example, in a flight from a certain point A to a point B, the less time the aircraft stays in the air, the less energy consumption. Even when the load on the rotary blade is reduced like a conventional aircraft, energy consumption becomes small, but as described above, it cannot reach the point B in the shortest distance because it rises due to the attack angle of the main body 10 in exchange. By reducing the rotation speed of the rotary blades to prevent this, the speed is reduced. As a result, the arrival at the point B is delayed, and the energy consumption increases as the flight time increases.

In order to move the multicopter at a higher speed, it is necessary to rotate the rotary blades that generate thrust faster, and the high-speed rotation of the rotary blade is made possible by increasing the load applied to the rotary blade.

In order not to reduce the rotation speed of the rotary blades, there is a method to make the aircraft heavier and increase the load of each rotary blade, but it is clear that making the aircraft heavier with unnecessary weights adversely affects fuel efficiency.

Therefore, an object of the present invention is to provide an aircraft that can improve cruising speed by changing the main body shape of the airframe (especially the multicopter) to a shape that suppresses drag while the main body suppresses drag in the cruising posture of the aircraft, while reducing unnecessary positive lift force.

Technical Solution

According to the present invention, there can be provided an aircraft equipped with plurality of rotary blades including a propeller and a motor, and having a min body with an inverted airfoil shape.

Advantageous Effects

According to the present invention, a body shape that improves the cruising speed of an aircraft can be provided.

DETAILED DESCRIPTION OF THE EMBODIMENTS

The contents of the embodiments of the present invention will be listed and described. The aircraft according to the embodiment of the present invention has the following configuration.

[Item 1]
An aircraft equipped with a plurality of rotary blades including a propeller and a motor, wherein the aircraft comprises a main body with an inverted airfoil shape.

[Item 2]
The aircraft according to Item 1, wherein the main body has an attack angle that does not generate a lift force or generates a negative lift force during cruising.

[Item 3]
The aircraft according to Item 2, wherein the main body has a positive attack angle of 12 degrees or less during cruising.

[Item 4]
The aircraft as in any one of Items 1 to 3, further comprising a mounting unit that can mount an object to be mounted.

[Item 5]
The aircraft according to Item 4, wherein the mounting unit is connected to the main body via a connection unit.

[Item 6]
The aircraft according to Item 5, wherein the connection unit keeps the mounting unit in a predetermined posture.

[Item 7]
The aircraft according to Item 6, wherein the predetermined posture is horizontal.

[Item 8]
The aircraft as in any one of Items 1 to 7, wherein a moving blade is further provided in the main body.

Details of Embodiments According to the Present Invention

Hereinafter, an aircraft according to embodiments of the present invention will be described with reference to the accompanying drawings.

Details of First Embodiment

Figure 1:
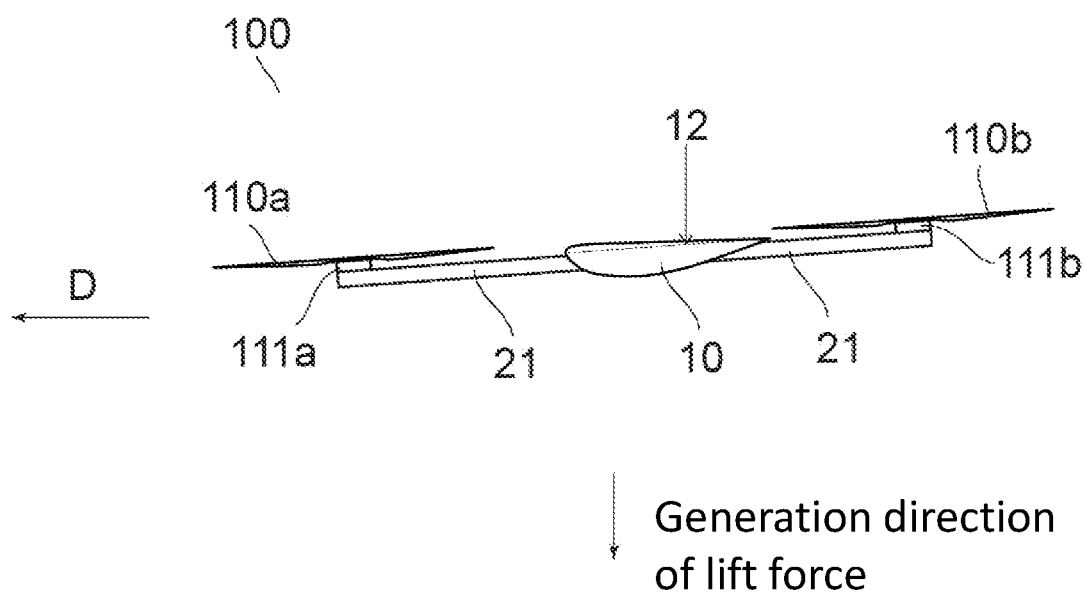
FIG. 1 is a conceptual diagram of an aircraft according to the present invention during cruising as viewed from the side.
Figure 1:
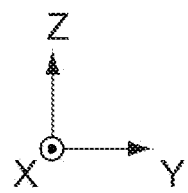

As shown in FIG. 1, an aircraft 100 according to an embodiment the present invention includes a flight unit 20 for performing flight that includes elements such as at least a main body 10, a plurality of rotary blades comprising a propeller 110 and a motor 111, a motor mount and frame 21 that support the motor, and the like. It is desirable that the aircraft is mounted with energy to operate them (for example, secondary battery, fuel cell, fossil fuel, etc.).

Further, the aircraft 100 shown in the figure is drawn in a simplified manner for facilitating the explanation of the structure of the present invention, and for example, the detailed configuration of the control unit and the like is not shown.

The aircraft 100 makes the direction of the arrow D (−Y direction) in the figure as the travelling direction (details will be described later).

Further, in the following explanation, the terms may be selectively used according to the following definitions. front-rear direction: +Y direction and −Y direction, up-down direction (or vertical direction): +Z direction and Z direction, left-right direction (or horizontal direction): +X direction and −X direction, travelling direction (forward): −Y direction, reverse direction (backward): +Y direction, ascending direction (upward): +Z direction, descending direction (downward): −Z direction.

The propeller 110 receives an output from a motor 111 to rotate. The rotation of the propeller 110 generates a propulsive force for taking off the aircraft 100 from a starting point, moving and landing it at a destination. Further, the propeller 110 can rotate rightward, stop, and rotate leftward.

The propeller 110 included in the aircraft of the present invention has one or more blades. Any number of blades (rotors) (e.g. 1, 2, 3, 4, or more blades) can be used. Further, the shape of the blade can be any shape such as a flat shape, a curved shape, a twisted shape, a tapered shape, or a combination thereof. Further, the shape of the blade can be changed (for example, expansion/contraction, folding, bending, etc.). The blades may be symmetrical (having the same upper and lower surfaces) or asymmetric (having different shaped upper and lower surfaces). The blades can be formed into an airfoil, wing, or geometry suitable for generating dynamic aerodynamic forces (e.g., lift, thrust) when the blades move through the air. The geometry of the blades can be appropriately selected to optimize the dynamic air characteristics of the blades, such as increasing lift and thrust and reducing drag.

Further, the propeller included in the aircraft of the present invention may be a fixed pitch, a variable pitch, or a mixture of a fixed pitch and a variable pitch, without being limited thereto.

The motor 111 causes the rotation of the propeller 110, and for example, the drive unit can include an electric motor, an engine, or the like. The blades could be driven by the motor and rotate around the rotary shaft of the motor (e.g., the major axis of the motor).

The blades can all rotate in the same direction or can rotate independently. Some of the blades rotate in one direction and the other blades rotate in the other direction. The blades can all rotate at the same rotation speed or can rotate at different rotation speeds. The rotation speed can be automatically or manually determined based on the dimensions (e.g., size, weight) and control state (speed, moving direction, etc.) of the moving body.

The aircraft 100 determines the rotation speed of each motor, or the flight angle according to the wind speed and the wind direction by a flight controller, a propo, or the like. Thereby, the aircraft can perform movements such as ascending, descending, accelerating, decelerating, and changing direction.

The aircraft 100 may perform autonomous flight according to a route or rule set in advance or during flight, or flight by manipulation using the propo.

Figure 2:
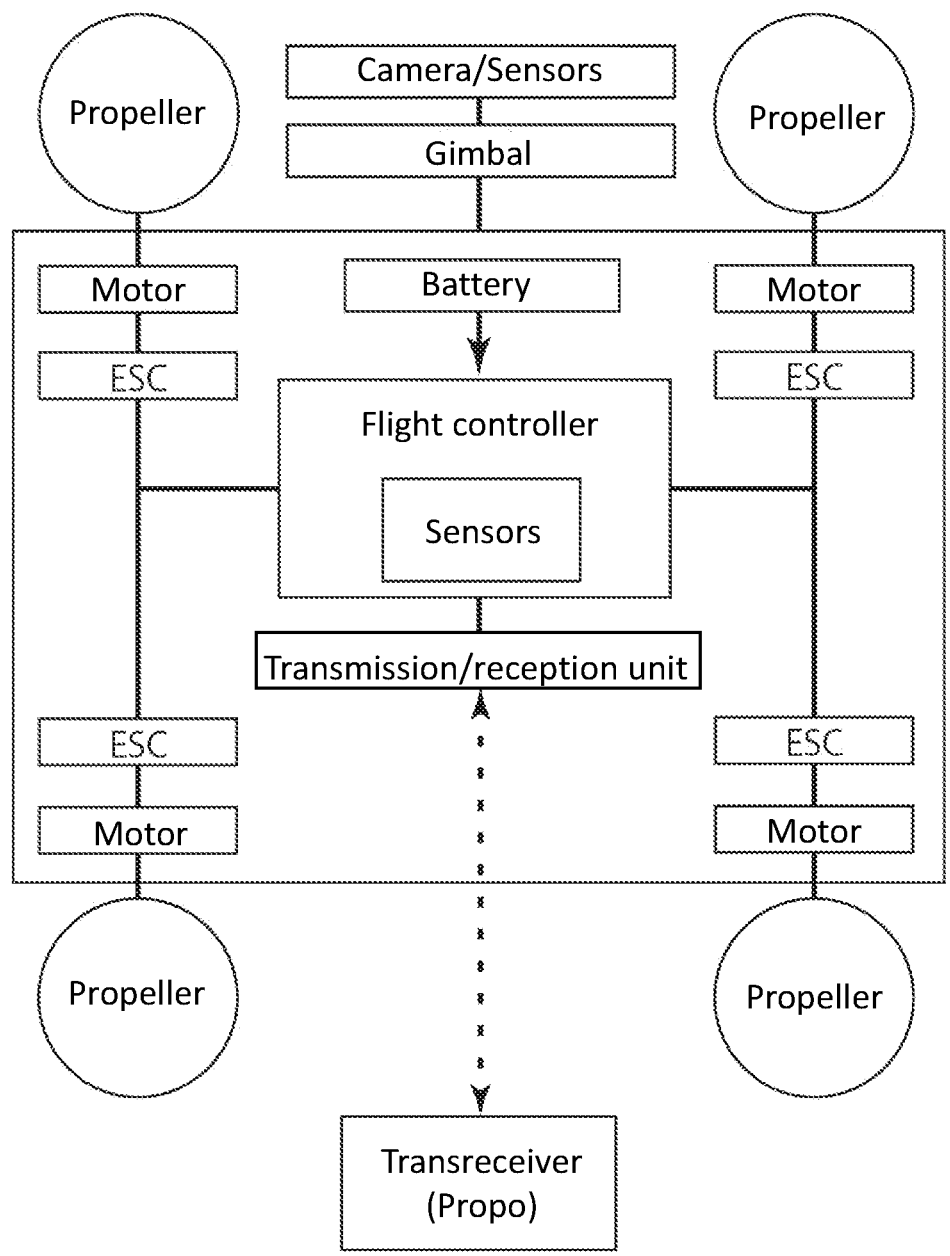
FIG. 2 is a functional block diagram of the aircraft of FIG. 1.

The above-mentioned aircraft 100 has a functional block shown in FIG. 2. In addition, the functional block of FIG. 2 is a minimum reference structure. A flight controller is a so-called processing unit. The processing unit may have one or more processors, such as a programmable processor (e.g., a central processing unit (CPU)). The processing unit has a memory that is not shown and it is possible to access the memory. The memory stores logic, codes, and/or program instructions that can be executed by the processing unit for performing one or more steps. The memory may include, for example, a separable medium such as an SD card or random access memory (RAM) or an external storage device. Data obtained from cameras and sensors may be transmitted directly to the memory and stored. For example, still image dynamic image data taken by a camera or the like is recorded in a built-in memory or an external memory.

The processing unit includes a control module configured to control the state of the rotorcraft. For example, the control module may control a propulsion mechanism (such as a motor) in order to adjust the spatial arrangement, velocity, and/or acceleration of the rotorcraft having six degrees of freedom (translational motions x, y, and z, and rotational motions θx, θy, and θz). The control module can control one or more of the states of a mounting unit and sensors.

The processing unit can communicate with a transmission/reception unit configured to transmit and/or receive data from one or more external devices (e.g., a terminal, display device, or other remote controller). The transceiver can use any suitable communication means such as wired or wireless communication. For example, the transmission/reception unit can use one or more of a local area network (LAN), a wide area network (WAN), infrared, wireless, WiFi, point-to-point (P2P) network, telecommunication network, cloud communication, and the like. The transmission/reception unit can transmit and/or receive one or more of, data acquired by sensors, process results generated by the processing unit, predetermined control data, user command from a terminal or a remote controller, and the like.

Sensors according to the present embodiment may include inertial sensors (acceleration sensors, gyro sensors), GPS sensors, proximity sensors e.g., LiDAR), or vision; image sensors (e.g., cameras).

Figure 3:
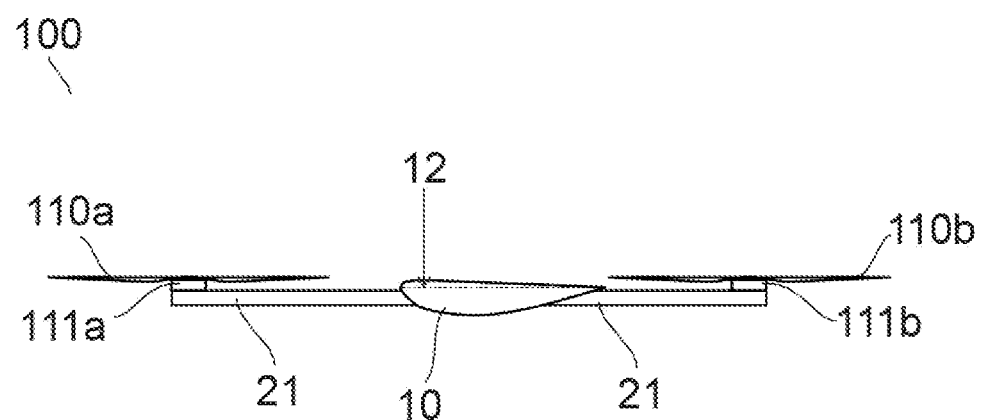
FIG. 3 is a side view of the aircraft of FIG. 1 when hovering.
Figure 3:
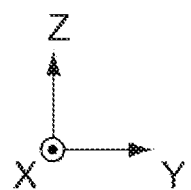
Figure 4:
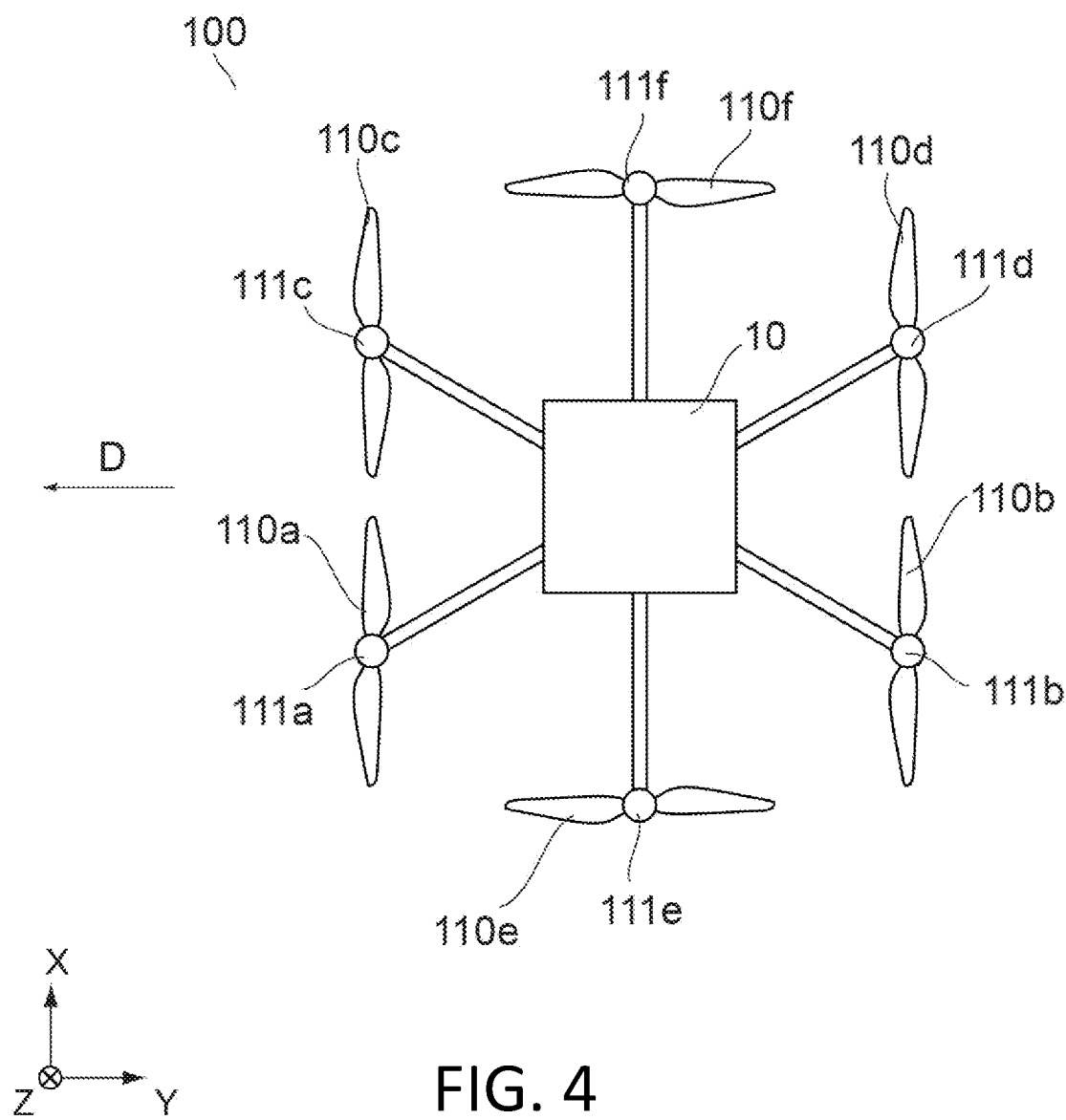
FIG. 4 is a top view of the aircraft of FIG. 1 when hovering.

As shown in FIG. 1 and FIG. 3, the flight unit 20 included in the aircraft 100 according to the embodiment of the present invention has an angle inclined forward toward the traveling direction during travelling. The forward inclined rotor creates lift in the upward direction and thrust in the travelling direction, whereby the aircraft 100 moves forward.

The aircraft 100 includes a main body that can include a processing unit or a battery to be mounted, a mounted object, and the like. The main body 10 is fixedly connected to the flight portion 20, and the posture of the main body 10 changes as the posture of the flight portion 20 changes. In the posture of the aircraft 100 during cruising, which is expected to be maintained for a long time during the movement of the aircraft 100, the flight time is effectively shortened by optimizing the shape of the main body 10 and improving the speed.

It is desirable that the main body 10 includes an outer skin that has a strength capable of withstanding flight and takeoff and landing. For example, plastic, FRP, and the like have rigidity and waterproofness, and are therefore suitable as materials for the outer skin. These materials may be the same materials as the frame 21 (including an arm) included in the flight portion 20 or may be different materials.

Further, the motor mount, the frame 21, and the main body 10 included in the flight portion 20 may be configured by connecting each component, or may be molded so as to be integrated by using a monocoque structure or an integral molding (for example, the motor mount and the frame 21 are integrally molded, the motor mount, the frame 21 and the main body 10 are integrally molded, etc.). By integrating the parts, it becomes possible to smooth the joints of each part, and thus it is expected that the aircraft such as the blended wing body and the lifting body has reduced drag and improved fuel efficiency.

The shape of the main body 10 included in the aircraft 100 is a shape with less drag and less unnecessary lift (the "reverse airfoil" shape described below) in the posture when the aircraft 100 is cruising. More preferably, it may be a shape with still less drag (for example, streamline), and the lift force generated may be in the negative direction. In FIG. 1, the negative lift force by the main body 10 is shown.

Figure 5A:
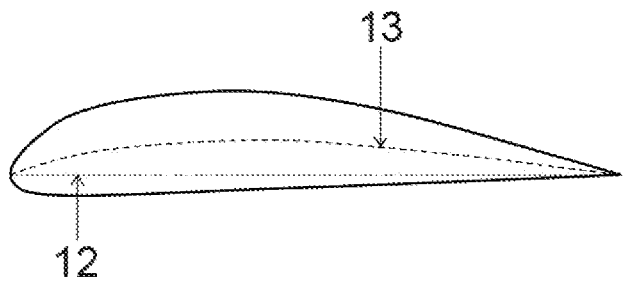
FIGS. 5A and 5B are diagrams showing a general airfoil.
Figure 5B:
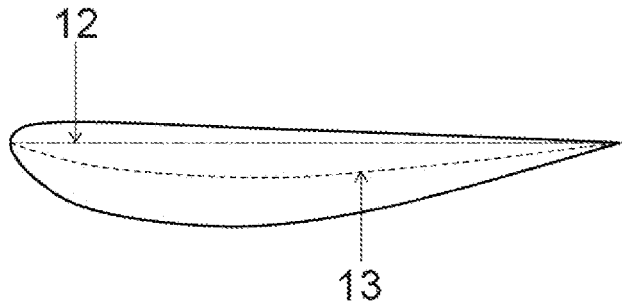
Figure 16:
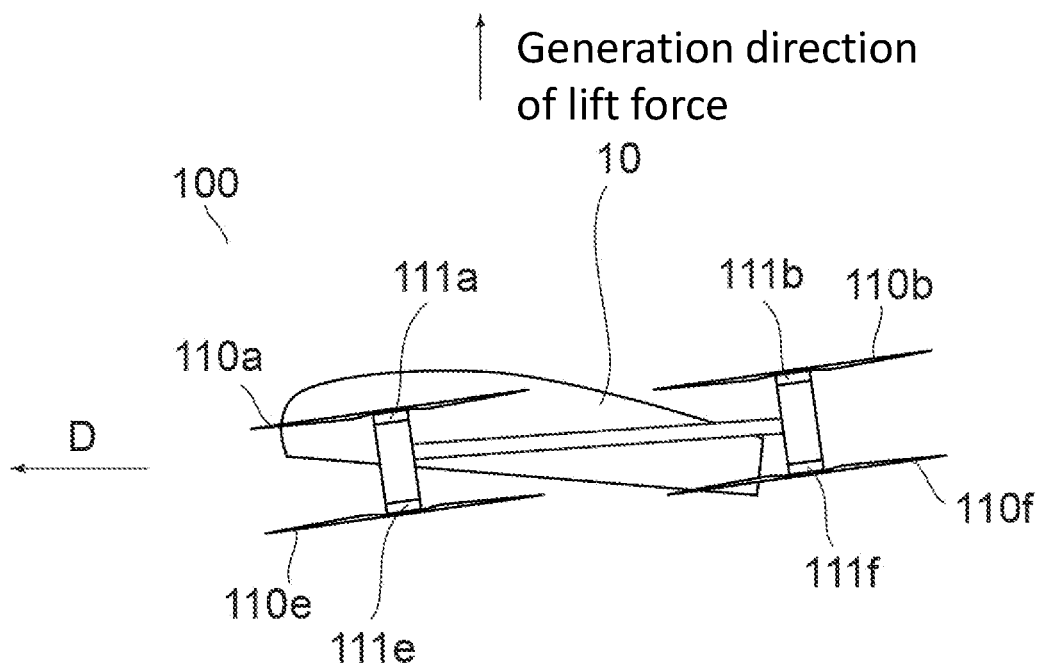
FIG. 16 is a side view when a conventional aircraft is cruising.
Figure 16:
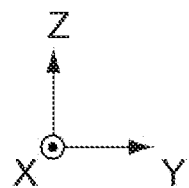
Figure 17:
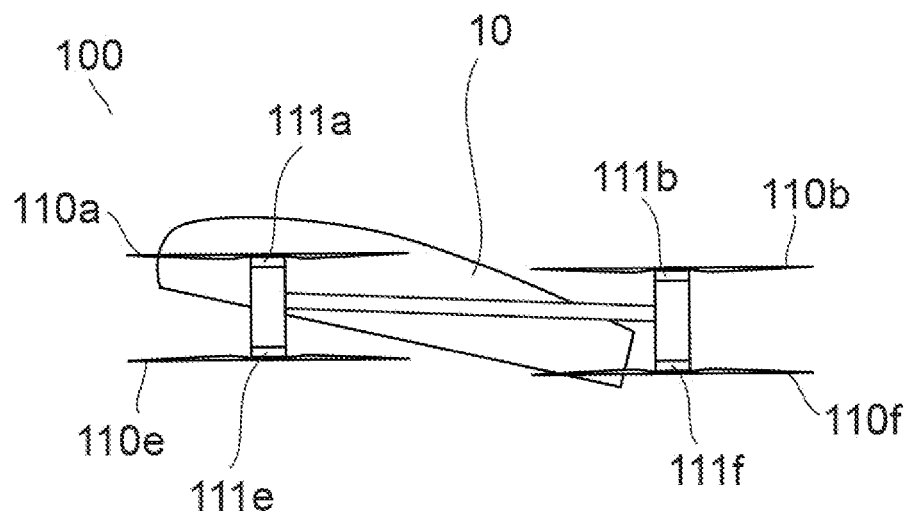
FIG. 17 is a side view when the conventional aircraft of FIG. 16 is hovering.
Figure 17:
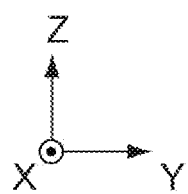
Figure 18:
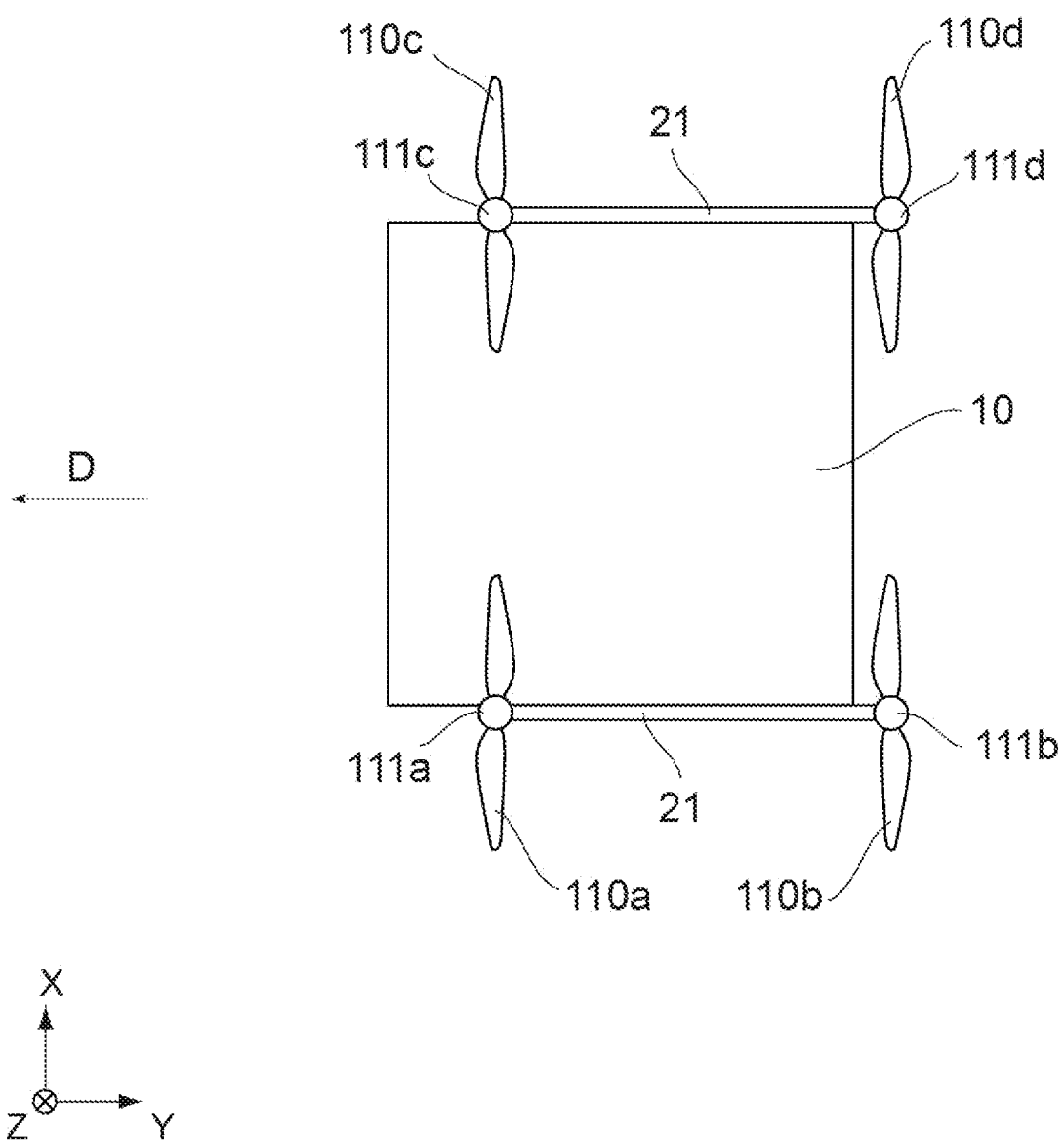
FIG. 18 is a top view when the conventional aircraft of FIG. 16 is hovering.

FIGS. 5A and 5B show an example of an airfoil (Gottingen 508). For example, in a general airfoil in FIG. 5A used for generating a lift force, such as the main body 10 of the conventional airframe shown in FIG. 16 and the like, a camber line 13 has a curved shape in which the central portion is convex upward (hereinafter collectively referred to as arch shape), and the amount of the camber line 13 above the blade chord 12 is large, or all of them are an upper side of the blade chord 12. On the other hand, in the airfoil in FIG. 5B in which the general airfoil in FIG. 5A is turned upside down, such as the main body 10 of the present invention shown in FIG. 1, the camber line 13 has an inverted arch shape, and the amount of the camber line 13 on the lower side of the blade chord 12 is large, or all of them are on the lower side of the blade chord 12. Like this airfoil in FIG. 5B, the camber line 13 has an inverted arch shape, and a shape in which the camber line 13 has a large amount of the lower side than the blade chord 12 or is all lower than the blade chord 12 is hereinafter collectively referred to as an inverted airfoil shape.

Figure 6:
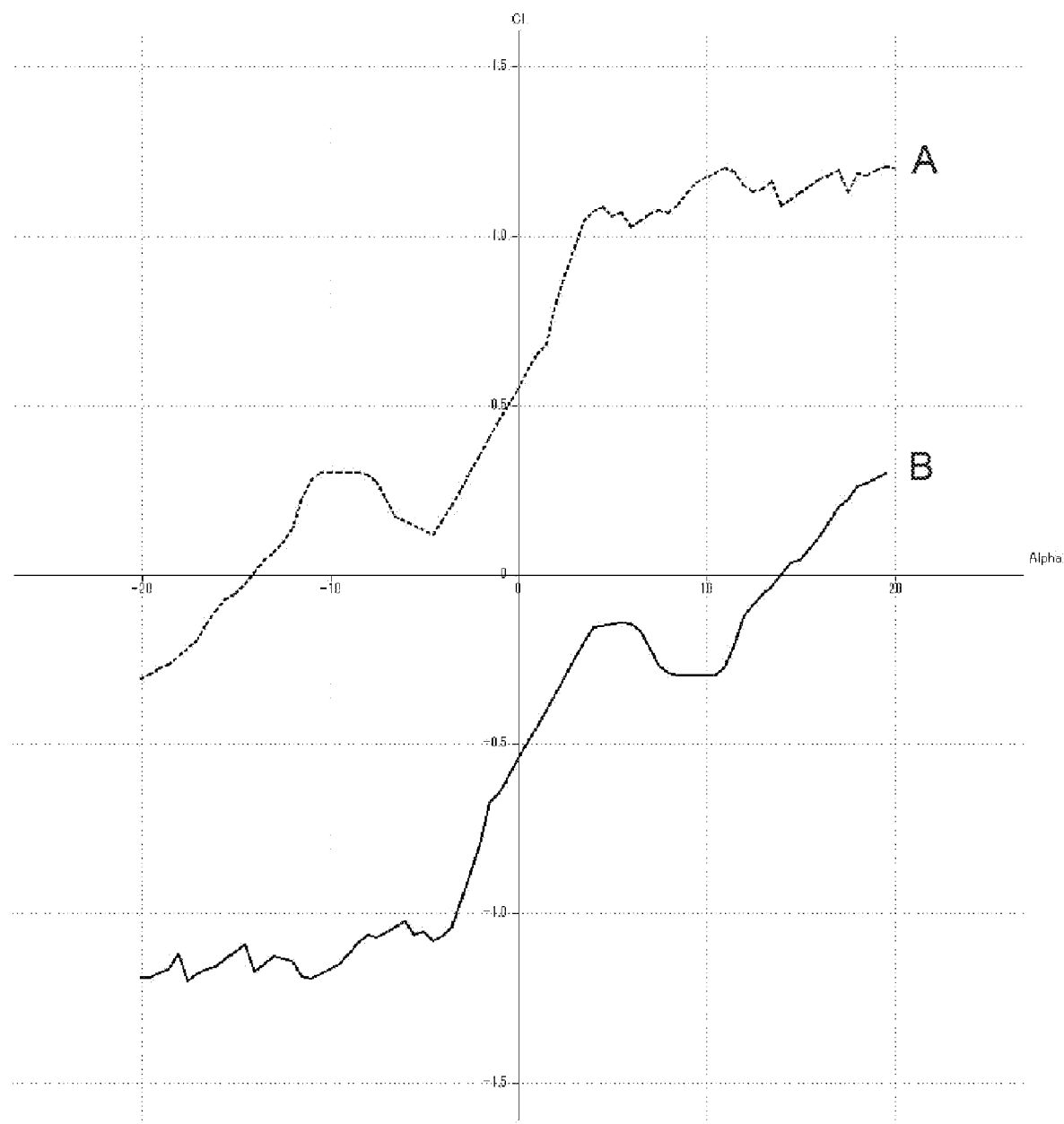
FIG. 6 is a graph showing the lift force characteristics of the airfoil of FIGS. 5A and 5B.
Figure 7:
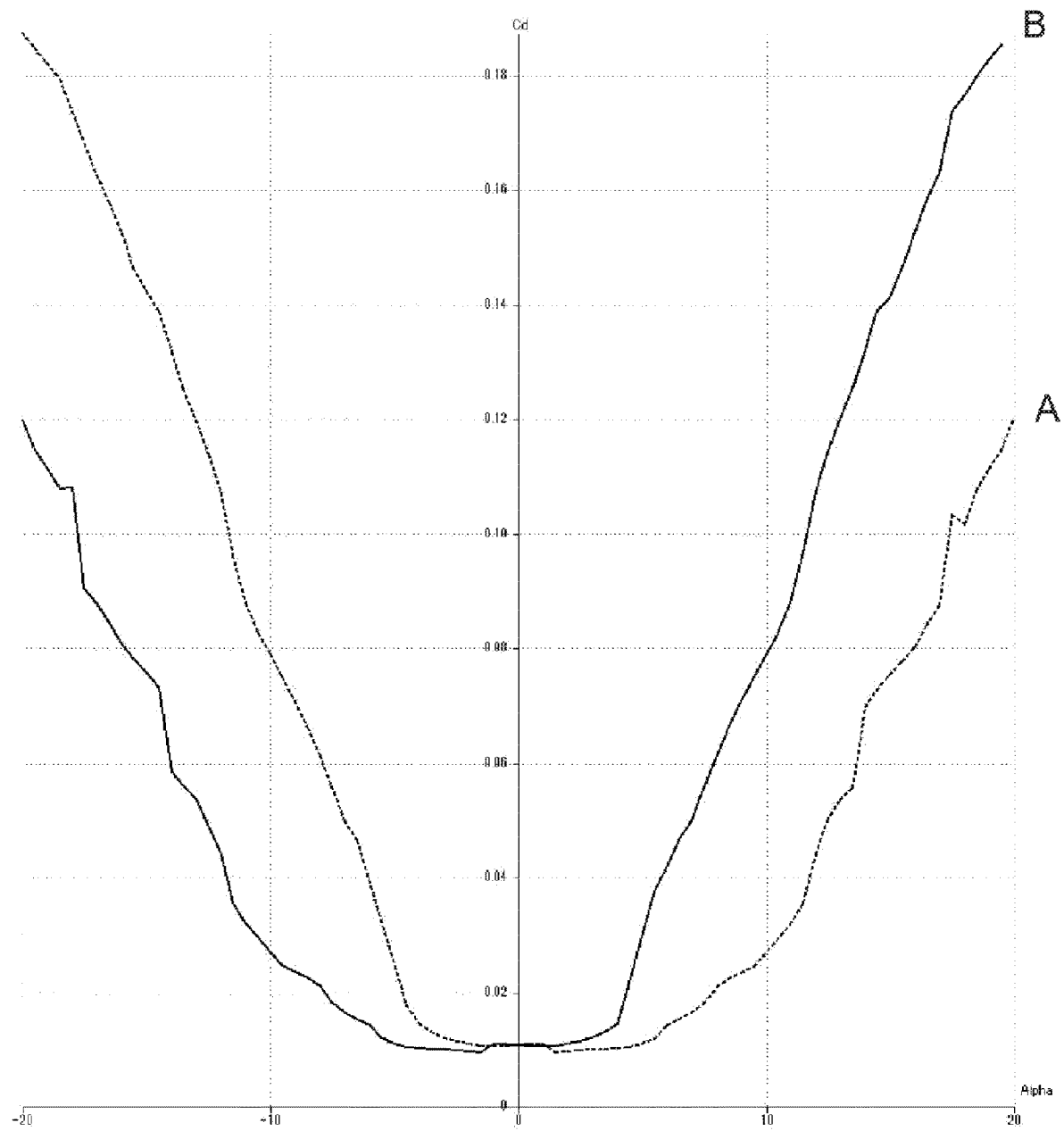
FIG. 7 is a graph showing the resistance characteristics of the airfoil of FIGS. 5A and 5B.

FIG. 6 and FIG. 7 show the lift and drag characteristics of airfoils in FIGS. 5A and 5B relative to a standard atmosphere of approximately 10 m/s, respectively. Ideally, the drag of the main body 10 should be small and thus, for example, when the lift force at the attack angle where the maximum drag is 0.04 or less or 0.03 or less (the maximum allowable drag can be set as appropriate) is referred to for each of the airfoils in FIGS. 5A and 5B, the airfoil in FIG. 5B, which is an inverted airfoil, has a smaller lift than the airfoil in FIG. 5A as shown in FIG. 6. That is, it can be said that the inverted airfoil shape has less drag and less unnecessary lift than other shape (particularly airfoil shape). Particularly, it is shown that in the inverted airfoil shape, even a positive attack angle does not generate a positive lift, or generates a negative lift (in FIG. 6, it can be seen that a positive lift is not generated if the positive attack angle is about 12 degrees or less). Further, as shown in FIG. 6, even in the airfoil in FIG. 5A, there is an attack angle range that does not generate a positive lift force or generates a negative lift force, but as shown in FIG. 7, the drag is greatly increased, so that the efficiency of forward movement is reduced.

Therefore, if the shape of main body 10 included in the aircraft 100 moving forward is an inverted airfoil shape, the drag by the main body 10 is small and the unnecessary lift is also small, so that the efficiency at the time of forward movement is improved.

More preferably, the shape of the main body 10 may be an inverted airfoil, and the aircraft 100 may have an attack angle that does not generate a lift force in the posture at the time of cruising. In this case, since a lift force by the main body of the conventional airframe is not generated, it is not necessary to suppress the rotation speed of the rotary blade during cruising and does not reduce the cruising speed of the aircraft. More preferably, when the shape of the main body 10 is an attack angle in which the aircraft 100 has an inverted airfoil shape and generates a negative lift force in the posture during cruising, the lift force due to the rotor is suppressed compared to the case where lift force is not generated, so that the lift force is allowed to increase as the number of revolutions increases, and at the same time, the increased thrust makes it possible to improve the cruising speed of the aircraft.

Figure 8:
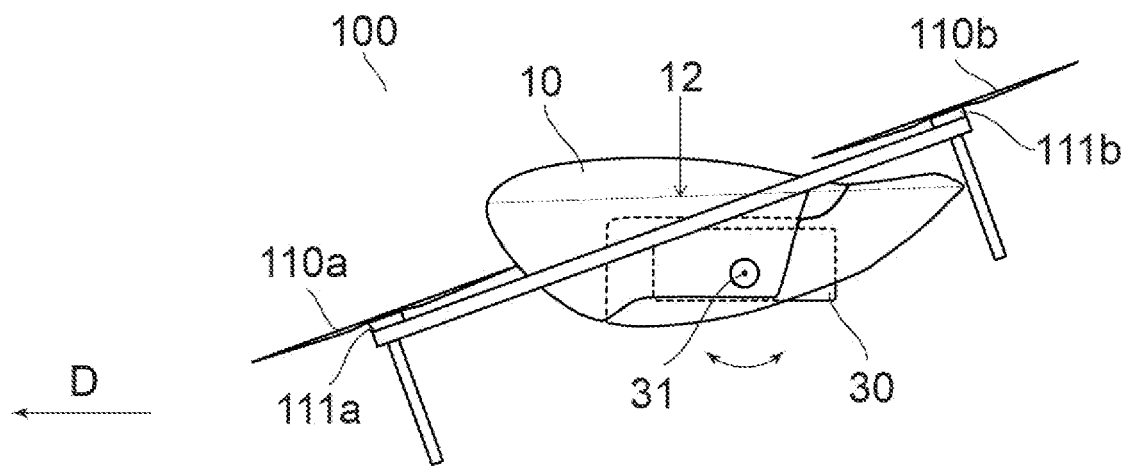
FIG. 8 is a side view of the configuration example of the aircraft according to the present invention when cruising.
Figure 8:
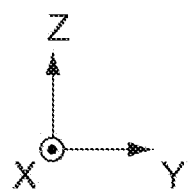
Figure 9:
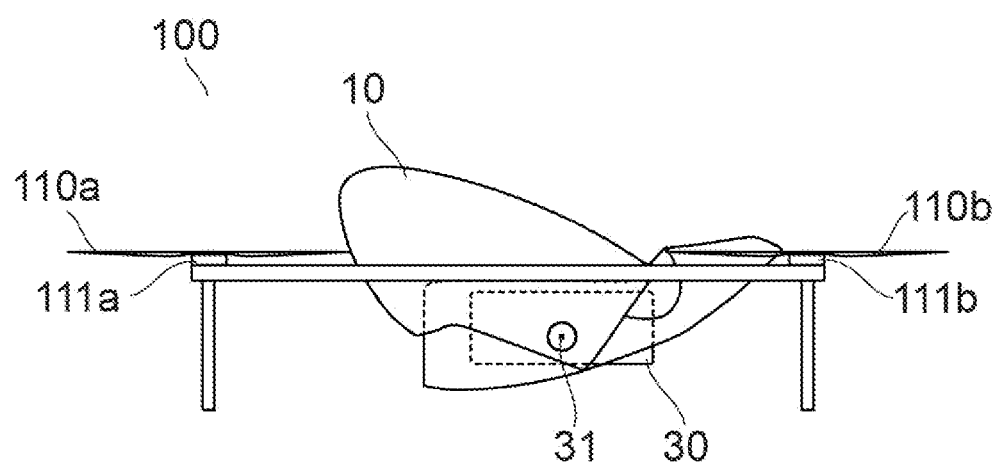
FIG. 9 is a side view of the aircraft of FIG. 8 when hovering.
Figure 9:
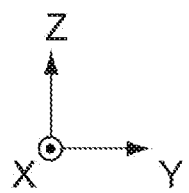
Figure 10:
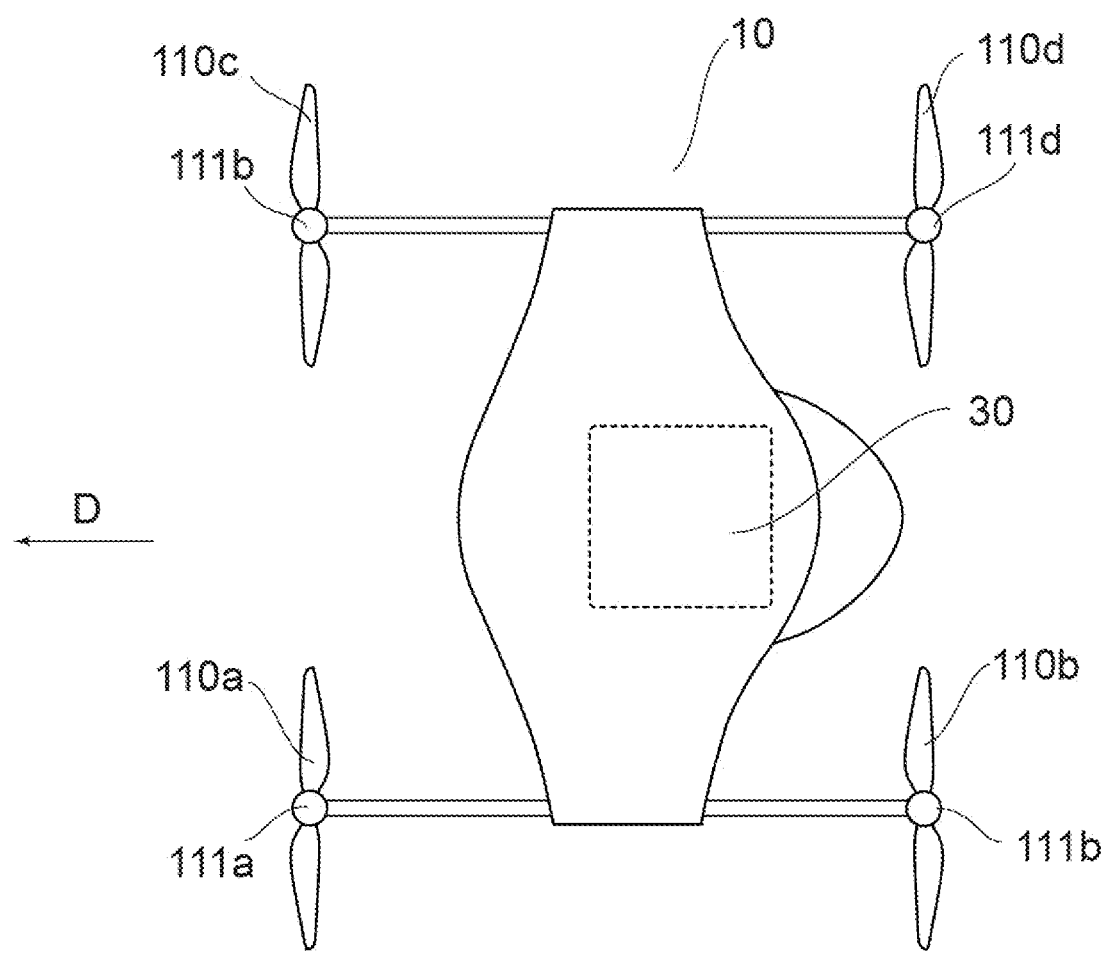
FIG. 10 is a top view of the aircraft of FIG. 8 when hovering.

As shown in FIGS. 8 to 10, since the aircraft 100 is used, for example, for the purpose of transporting luggage such as home delivery, it may be provided with a mounting unit 30 that can be mounted by storing the mounted object (transport object) inside. Further, the mounting unit 30 is connected via a connection unit 31 such as a rotation shaft or a gimbal having one or more degrees of freedom so that the mounting unit 30 can be displaced independently of the main body 10 and the flight unit 20, so that the mounting unit 30 and the contained object to be transported can be kept in a predetermined attitude (for example, horizontal) regardless of the posture of the aircraft 100.

When the posture of the mounting unit 30 is maintained more actively, a sensor for detecting the angle, a motor, a servo, or a mechanism for maintaining the posture of the mounting unit can be used. The position of the connection unit 31 by the gimbal can be provided above the center of gravity of the mounting unit 30, and the posture may be maintained by using the own weight of the mounting unit 30.

Figure 11A:
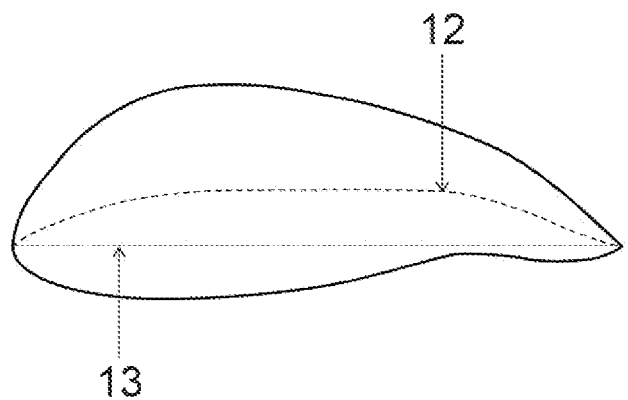
FIGS. 11A and 11B are schematic diagrams showing the main body shape of the aircraft of FIG. 8.
Figure 11B:
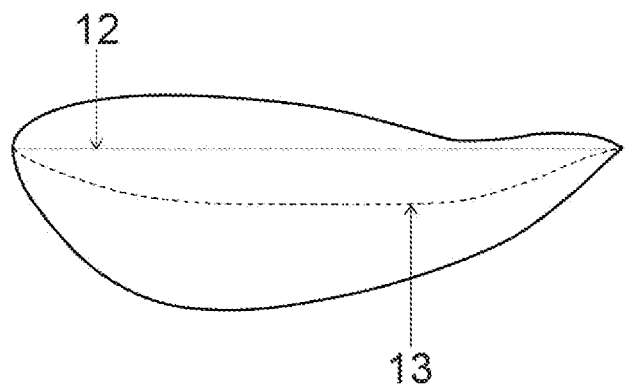

As shown in the schematic diagram shown in FIGS. 11A and B, the airfoil in FIG. 11B such as the main body 10 of the aircraft 100 in FIG. 8 has a camber line 13 having an inverted arch shape, and the camber line 13 has an inverted airfoil shape on the lower side of the blade chord 12, and the same effect as the above-mentioned airfoil in FIG. 5B can be obtained. As another example of the airfoil in FIG. 5A, the airfoil in FIG. 11A in which the airfoil in FIG. 11B is turned upside down is used for comparison.

Figure 12:
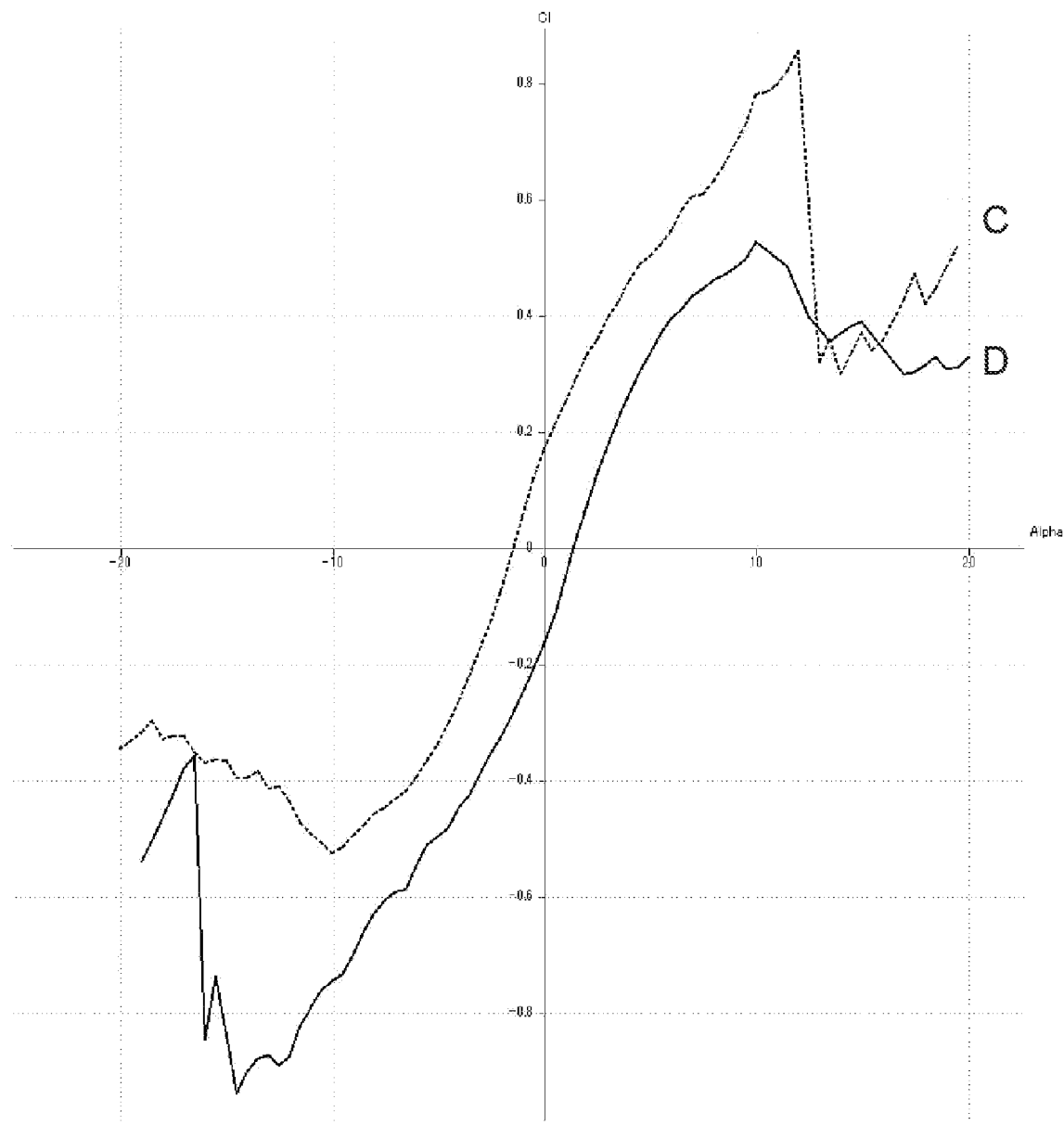
FIG. 12 is a graph showing the lift force characteristics of the shape of FIGS. 11A and 11B.
Figure 13:
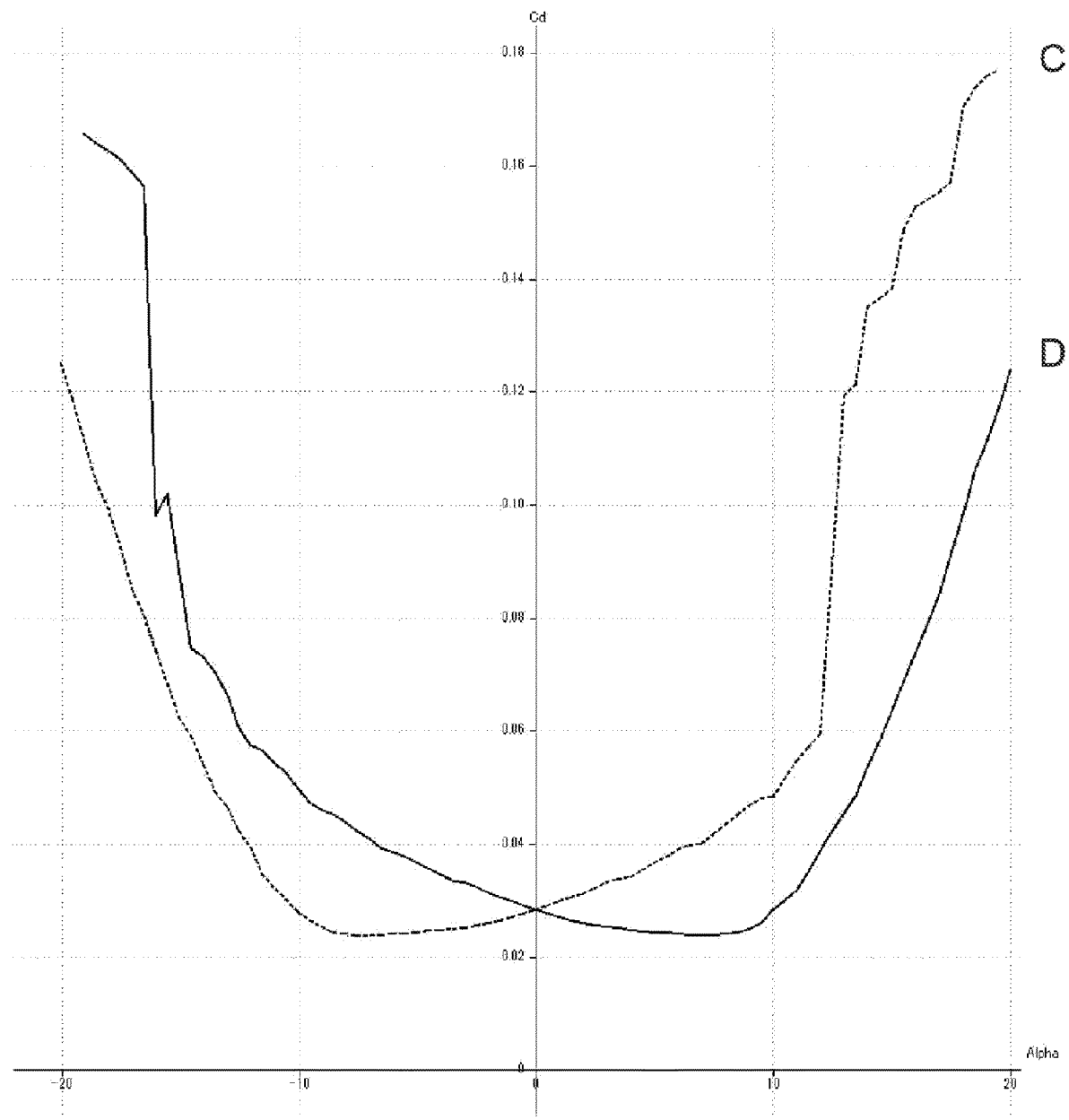
FIG. 13 is a graph showing the resistance characteristics of the shape of FIGS. 11A and 11B.

FIG. 12 and FIG. 13 show the lift and drag characteristics, respectively, of airfoil shapes in FIGS. 11A and 11B relative to an atmosphere of approximately 10 m/s in standard air. From these graphs, in the attack angle within the same drag range (for example, maximum drag of 0.04 or less, 0.03 or less, etc.), the airfoil in FIG. 11B, which is an inverted airfoil, has a smaller lift than the airfoil in FIG. 11A. Therefore, even in the aircraft object provided with the reverse airfoil-shaped main body of FIGS. 11A and 11B, it is possible to suppress unnecessary lift and suppress an increase in drag.

Because the lift characteristics and resistance characteristics shown by the main body 10 during cruising change depending on various factors such as the cruising speed, the shape and size of the main body, etc., it is desirable that the shape of the main body is determined in consideration of the application of the aircraft and the operating environment. At this time, by selecting a shape that has less unnecessary lift (furthermore, a negative lift is generated) and a shape that can be achieved with a smaller increase in drag, the forward speed of the aircraft is efficiently improved.

Details of Second Embodiment

In the details of the second embodiment according to the present invention, the components overlapping with the first embodiment perform the same or the similar operation, and thus, the description thereof will be omitted again.

Figure 14:
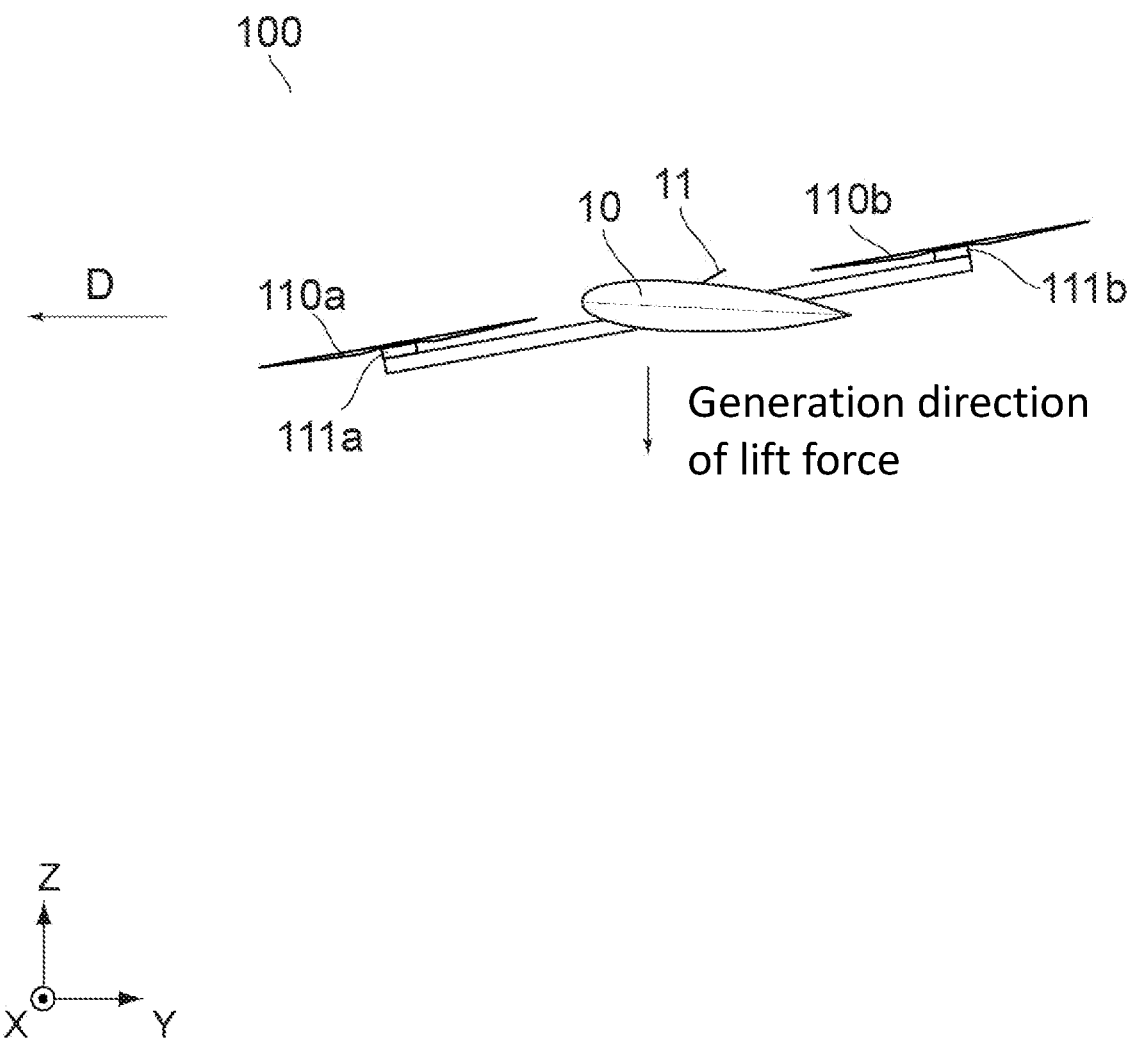
FIG. 14 is a side view of the configuration example of the aircraft according to the present invention when cruising.
Figure 15:
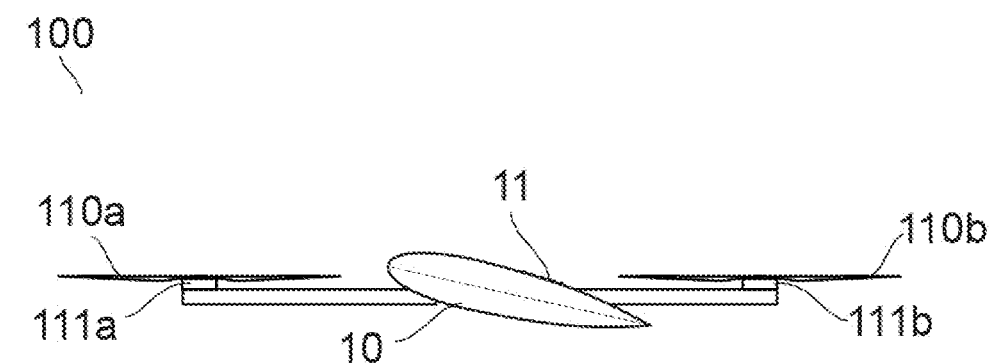
FIG. 15 is a side view of the aircraft of FIG. 14 when hovering.
Figure 15:
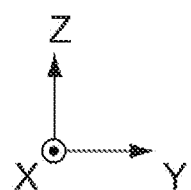

As shown in FIGS. 14 and 15, the main body 10 may include a moving blade 11. By deploying the moving blade 11 and giving it the role of a spoiler, it is possible to reduce the lift force generated by the main body 10. For example, as shown in FIGS. 5A and 5B and FIGS. 11A and 11B, in a state in which the rotary blade 11 is not deployed, even in a shape with a large positive lift, the main body 10 has a shape that reduces unnecessary lift force by deploying the moving blade 11, more preferably does not generate a lift force, and even more preferably produces negative lift force. In particular, for an air vehicle whose cruising speed is low (for example, an air speed of about 10 km/h), a method of using the main body 10 having the moving blade 11 in a shape that emphasizes the amount of decrease in drag rather than the amount of decrease in the amount of positive lift is preferable.

In addition, the moving blades 11 may be further provided on the main body 10 that does not generate positive lift even if the moving blades do not deploy, thereby further increasing the negative lift.

The configuration of the aircraft in each embodiment can be implemented by combining a plurality of them. It is desirable to consider an appropriate configuration according to the cost of producing the aircraft and the environment and characteristics of the place where the aircraft is operated.

The above-mentioned embodiments are merely examples for facilitating the understanding of the present invention and are not intended to limit the present invention. It goes without saying that modification and improvement can be made to the present invention without departing from the gist thereof, and the equivalents are included within the scope of the present invention.

DESCRIPTION OF REFERENCE NUMERALS

10: main body
11: moving blades
12: blade chord line
13: camber line
20: flight unit
21: frame
30: mounting unit
31: connection unit
100: aircraft
110a~110h: propeller
111a~111h: motor

The invention claimed is:

1. An aircraft comprising:
   a plurality of rotary blades each including a propeller and a motor; and
   a main body with an inverted airfoil shape in which a camber line is lower than a blade chord; and
   a mounting unit configured to store an object therein,
   wherein the main body is rotatably connected to the mounting unit via a connection unit about an axis perpendicular to a plane defined by a traveling direction of the aircraft and a vertical direction, and the mounting unit and the connection unit are inside of the main body.

2. The aircraft according to claim 1, wherein a moving blade is further provided in the main body and configured to reduce lift force generated by the main body.

3. The aircraft according to claim 1, wherein the camber line of the main body is entirely lower than the blade chord of the main body.

4. The aircraft according to claim 1, wherein the connection unit has one or more degrees of freedom and is provided above a center of gravity of the mounting unit.

5. The aircraft according to claim 1, further comprising a plurality of frames connecting the plurality of rotary blades to the main body,
wherein the propeller rotates about a major axis of the motor, the major axis of the motor being perpendicular to a corresponding one of the plurality of frames.

6. The aircraft according to claim 1, wherein the main body has an attack angle that does not generate a lift force or generates a negative lift force during cruising.

7. The aircraft according to claim 6, wherein the main body has a positive attack angle of 12 degrees or less during cruising.

8. The aircraft according to claim 1, wherein the connection unit keeps the mounting unit in a predetermined posture.

9. The aircraft according to claim 8, wherein the predetermined posture is horizontal.

* * * * *